United States Patent
Lim et al.

(10) Patent No.: US 6,849,100 B2
(45) Date of Patent: Feb. 1, 2005

(54) FRESH AIR DUCTS INCLUDING DOWNSTREAM FILTERS FOR CLEAN ROOMS

(75) Inventors: Chang-Su Lim, Kyunggki-do (KR); Suk-Hee Im, Kyunggi-do (KR); Jung-Sung Hwang, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/272,319

(22) Filed: Oct. 16, 2002

(65) Prior Publication Data

US 2004/0003581 A1 Jan. 8, 2004

(30) Foreign Application Priority Data

Jul. 6, 2002 (KR) .......................... 2002-39160

(51) Int. Cl.[7] .................. B01D 29/01; B01D 46/12
(52) U.S. Cl. .................. 55/385.2; 55/471; 55/473; 55/480; 55/482; 55/505
(58) Field of Search ................ 55/385.1, 385.2, 55/467, 471, 473, 480, 482, 505, 506

(56) References Cited

U.S. PATENT DOCUMENTS

| | | | | | |
|---|---|---|---|---|---|
| 3,263,704 A | * | 8/1966 | Boisjoly | ...................... | 138/42 |
| 4,350,509 A | * | 9/1982 | Alseth et al. | .................. | 55/337 |
| 4,549,472 A | * | 10/1985 | Endo et al. | ................. | 454/187 |
| 4,699,640 A | * | 10/1987 | Suzuki et al. | ............... | 55/385.2 |
| 5,039,321 A | * | 8/1991 | Satoh et al. | ..................... | 96/361 |
| 5,096,477 A | * | 3/1992 | Shinoda et al. | ............ | 55/385.2 |
| 5,326,316 A | * | 7/1994 | Hashimoto et al. | ......... | 454/187 |
| 5,494,497 A | * | 2/1996 | Lee | ............... | 55/480 |
| 5,626,820 A | | 5/1997 | Kinkead et al. | ............ | 422/122 |
| 5,827,339 A | * | 10/1998 | Nagafune et al. | .......... | 55/350.1 |
| 5,876,280 A | * | 3/1999 | Kitano et al. | ................ | 454/187 |
| 5,890,367 A | | 4/1999 | You et al. | ........................ | 62/78 |
| 5,922,105 A | * | 7/1999 | Fujii et al. | ..................... | 95/63 |
| 6,033,301 A | * | 3/2000 | Suwa | ........................ | 454/187 |
| 6,123,617 A | * | 9/2000 | Johnson | ...................... | 454/187 |
| 6,146,451 A | * | 11/2000 | Sakata et al. | ................. | 96/135 |
| 6,344,074 B1 | * | 2/2002 | Ward et al. | .................... | 96/399 |
| 6,352,578 B1 | * | 3/2002 | Sakata et al. | ................. | 96/134 |
| 6,402,613 B1 | * | 6/2002 | Teagle | .......................... | 454/195 |
| 6,572,468 B1 | * | 6/2003 | Sasaki et al. | ............... | 454/187 |
| 2003/0159415 A1 | * | 8/2003 | Parker | .......................... | 55/481 |

FOREIGN PATENT DOCUMENTS

| | | |
|---|---|---|
| JP | 2000-18663 | 1/2000 |
| JP | 2002-106939 | 4/2002 |
| KR | 1998-10189 | 4/1998 |
| KR | 2000-819 | 1/2000 |

OTHER PUBLICATIONS

Notice to File Response for corresponding Korean Application No. 2002–0017479 dated Jul. 22, 2004 (English Translation).

* cited by examiner

*Primary Examiner*—Robert H. Spitzer
(74) *Attorney, Agent, or Firm*—Myers Bigel Sibley & Sajovec

(57) ABSTRACT

A fresh air duct is configured to direct fresh air filtered by an air conditioning system towards a clean room downstream from the fresh air duct, the fresh air having a first level of particle density. A separate particle filter in the fresh air duct, located downstream from the air conditioning system and upstream from the clean room, is configured to further filter the fresh air to provide filtered fresh air having a second level of particle density therein that is less than the first level. Related methods are also disclosed.

21 Claims, 13 Drawing Sheets

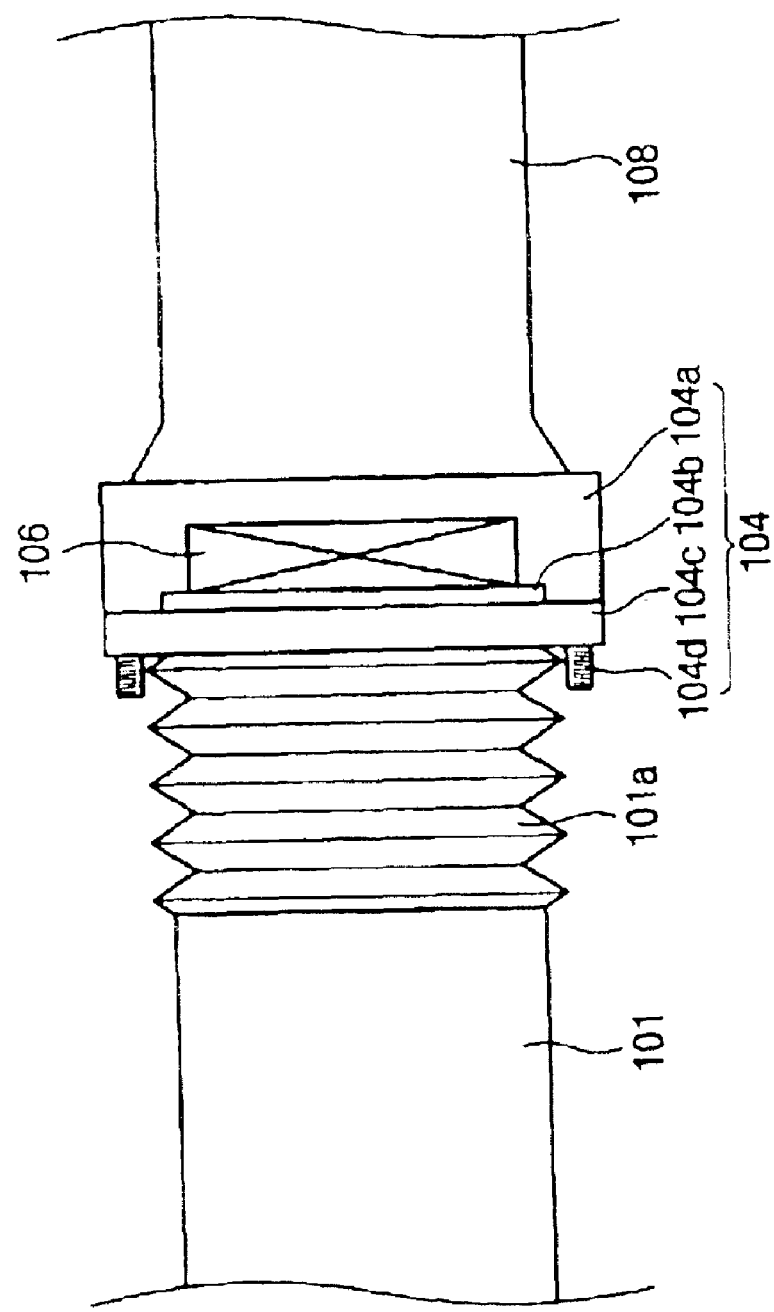

FRESH AIR DUCTS INCLUDING DOWNSTREAM FILTERS FOR CLEAN ROOMS

CLAIM FOR PRIORITY AND REFERENCE TO RELATED APPLICATION

This application is related to Korean Patent Application No. 2002-39160 filed on Jul. 6, 2002, the entire disclosure of which is incorporated herein by reference.

FIELD OF THE INVENTION

The present invention relates to the field of integrated circuit fabrication, and more particularly, to clean rooms used in the fabrication of integrated circuits.

BACKGROUND OF THE INVENTION

Integrated circuit devices are typically fabricated in what is commonly referred to as a clean room environment. As the term implies, a clean room environment can be essentially free of particles that can affect the yield of the integrated circuits produced in the clean room. In particular, substances, either created during the manufacturing process itself or introduced to the clean room via external air supplied to the clean room, can contaminate the integrated circuits produced by the clean room thereby leading to their premature failure.

The types of devices fabricated in the clean room can dictate the degree of filtering of external air provided to the clean room. For example, studies have shown that in order to reliably produce 256 MB DRAMs having a design rule of 0.25 $\mu$m, particles having a size greater than 0.25 $\mu$m should be removed or filtered from the clean room. In addition, the temperature, humidity, and pressure of the air in the clean room may be controlled. Other types of environmental factors, such as illumination, noise, and vibration, may also be controlled.

In order to provide the filtering discussed above, air is provided to the clean room through an air conditioning apparatus having filter units that can filter external air (i.e., air obtained from an external environment) to the clean room. In particular, in some conventional approaches, fresh air produced by the air conditioner is introduced below the floor of the clean room which is then circulated above the ceiling of the clean room and into the clean room.

As the concentration of fine particles contained in the external air is increased, it may be difficult for a conventional air conditioner to filter the air to the level needed by the clean room which can increase contamination in the clean room resulting in a decrease in the yield of integrated circuits manufactured in the clean room. For example, a phenomenon referred to as "yellow sand dust" (or "dust") can dramatically affect the yield of integrated circuits produced in a clean room. The yellow sand dust phenomenon can be characterized as when the external air includes an abnormally high level of sulfuric oxide, nitric oxide, and/or silicon. The yellow sand dust phenomenon can occur at particular times of the year and in particular geographic locations. For example, measurements in the area of Seoul, Republic of Korea in the year 2001, showed that density of dust in the air during the occurrence of the yellow sand dust phenomenon was about 7 to 14 times greater than the density at other times of the same year in the same location. In particular, the density of the dust was measured to be in a range between about 473 $\mu$g/m³ and about 999 $\mu$g/m³ during 2001 in Seoul. Furthermore, ozone, $SO_2$ and/or $NO_x$ contained in the external air during the summer months can in turn be introduced into the clean room if proper filtering is not performed.

FIG. 1 is a greatly enlarged schematic view that illustrates a particle 10 lodged on a pattern 20 of an integrated circuit in a clean room. The particle 10 can cause the integrated circuit to be inoperative or to function improperly. The particle 10 can be about 0.05 $\mu$m in diameter and have a circular or annular ring shape.

FIG. 2 is a graph that illustrates measured compositions of the particle 10 shown in FIG. 1. In particular, an EDS (Energy Dispersive X-ray Spectrometer) shows that the particle 10 can include significant amounts of silicon and oxygen which are present in the composition of the dust produced during the yellow sand dust phenomenon. As shown in FIG. 2, many of the particles shown in the EDS have a size less than 0.05 $\mu$m.

It is known to use an air conditioner including an HEPA (high efficiency particulate air filter) and a chemical filter to filter air provided to a clean room. U.S. Pat. No. 5,890,367 to You et al. entitled Air Conditioning System for Semiconductor Clean Room Including a Chemical Filter Downstream of a Humidifier discusses the removal of chemical impurities from the air provided by the air conditioner, such as phosphoric acid generated by the process of manufacturing the integrated circuits, using a chemical filter located between the air conditioner, having a humidifier, and an ULPA (ultra low penetration air) filter.

SUMMARY OF THE INVENTION

Embodiments according to the present invention can provide fresh air ducts including separate particle filters downstream from air conditioning systems for use with clean rooms. Pursuant to these embodiments, a fresh air duct can be configured to direct fresh air filtered by an air conditioning system towards a clean room downstream from the fresh air duct, the fresh air having a first level of particle density. A separate particle filter in the fresh air duct, located downstream from the air conditioning system and upstream from the clean room, can be configured to further filter the fresh air to provide filtered fresh air having a second level of particle density therein that is less than the first level.

In some embodiments according to the present invention, the air conditioning system accepts external air having a third level of particle density that is greater than the first and second levels and is in a range between about 473 $\mu$/m³ and about 999 $\mu$g/m³. In some embodiments according to the present invention, the separate particle filter is in an outlet section of the fresh air duct adjacent the clean room.

In some embodiments according to the present invention, the separate particle filter can be at least one of an HEPA filter configured to filter about 99.97% of particles about 0.3 $\mu$m in size from the fresh air generated by the air conditioning system, an ULPA filter configured to filter about 99.99% of particles about 0.1 $\mu$m to about 0.17 $\mu$m in size from the fresh air generated by the air conditioning system, and an ozone filter.

In some embodiments according to the present invention, a second filter is located downstream from the first filter and upstream from the clean room. The second filter can be at least one of an HEPA filter configured to filter about 99.97% of particles about 0.3 $\mu$m in size from the fresh air generated by the air conditioning system, an ULPA filter configured to filter about 99.99% of particles about 0.1 $\mu$m to about 0.17 $\mu$m in size from the fresh air generated by the air conditioning system, a chemical filter and an ozone filter. In some embodiments according to the present invention, the second filter is included in an outlet section of the fresh air duct adjacent to the clean room.

In some embodiments according to the present invention, the separate particle filter can be a detachable filter and the fresh air duct can further include a first portion of the fresh air duct configured to direct air from an input of the fresh air duct to an output of the first portion and a second portion of the fresh air duct releaseably coupled to the output of the first portion and configured to direct air from the output of the first portion along a pathway through the second portion. The detachable filter is in the second portion of the fresh air duct.

In some embodiments according to the present invention, the detachable filter can be a first detachable filter. An outlet portion of the fresh air duct is located downstream from the second portion and a second detachable filter is in the outlet portion configured to provide filtered air downstream of the second detachable filter to the clean room. In some embodiments according to the present invention, the filter is located adjacent to an input of the second portion of the fresh air duct.

In some embodiments according to the present invention, the first portion can be a flexible section configured to allow the first portion of the fresh air duct to move away from an input of the second portion of the fresh air duct to expose the detachable filter. In some embodiments according to the present invention, a third portion of the fresh air duct is coupled to the second portion and has at least one output therefrom. A second detachable filter is included in the third portion and is configured to filter the fresh air conducted along the pathway to the at least one output from the fresh air duct into the clean room.

In some embodiments according to the present invention, a third portion of the fresh air duct is coupled to the second portion and has a plurality of outputs therefrom. A plurality of detachable filters is located in the third portion upstream from the plurality of outputs.

In further embodiments according to the present invention, a fresh air duct is located downstream from an air conditioning system and is configured to direct fresh air from the air conditioning system to a clean room. A detachable filter, is located in the fresh air duct and is configured to filter the fresh air to provide filtered fresh air downstream of the detachable filter.

In some embodiments according to the present invention, the fresh air duct can be a first portion of the fresh air duct configured to direct air from an input of the fresh air duct to an output of the first portion and a second portion of the fresh air duct that is releaseably coupled to the output of the first portion and is configured to direct air from the output of the first portion along a pathway through the second portion, wherein the detachable filter is in the second portion of the fresh air duct. In some embodiments according to the present invention, the detachable filter is inside the clean room.

In some embodiments according to the present invention, an outlet portion of the fresh air duct is located downstream from the second portion. A second detachable filter is located in the outlet portion and is configured to provide filtered air of the second detachable filter into the clean room.

Embodiments of methods according to the present invention can include providing fresh air filtered by an air conditioning system downstream towards the clean room, the fresh air having a first level of particle density, further filtering the fresh air downstream from the air conditioning system to provide filtered fresh air having a second level of particle density that is less than the first level and providing the filtered fresh air to the clean room.

BRIEF DESCRIPTION OF THE DRAWINGS

FIGS. 4A–4B are schematic views that illustrate embodiments of fresh air ducts according to the present invention.

DESCRIPTION OF EMBODIMENTS ACCORDING TO THE INVENTION

Figure 1:
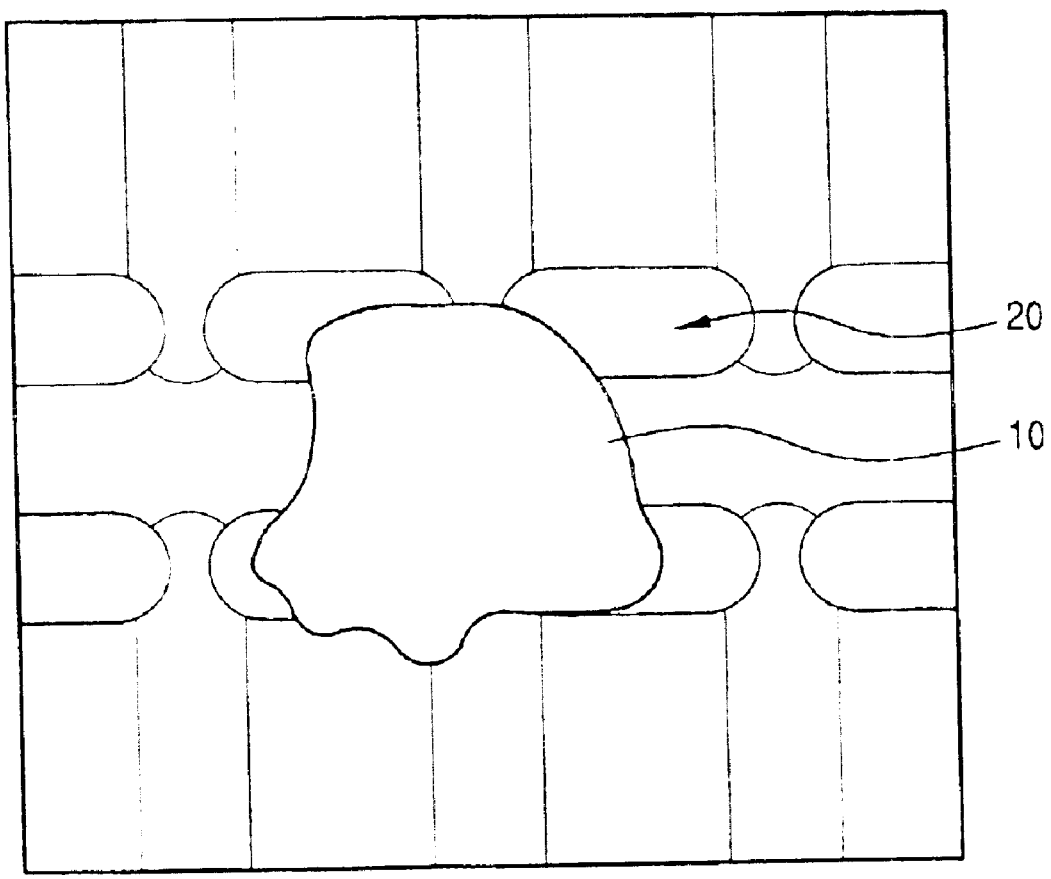
FIG. 1 is a greatly enlarged schematic view of a particle lodged on a pattern of an integrated circuit device.
Figure 2:
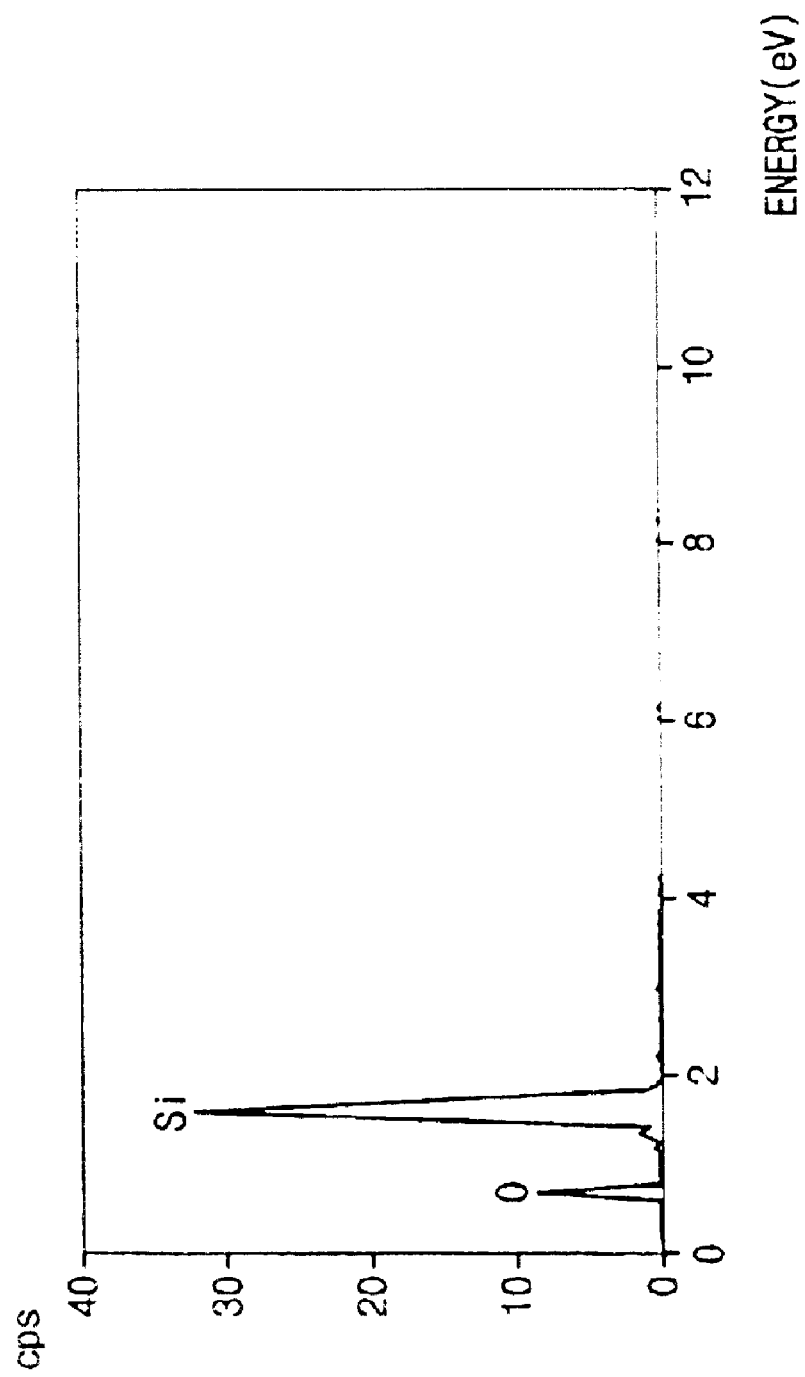
FIG. 2 is an EDS illustrating the composition of a particle commonly associated with the yellow sand dust phenomenon.

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of regions may be exaggerated for clarity. It will be understood that when an element such as a duct or portion of a duct is referred to as being "connected" or "coupled" to another element, it can be directly connected to the other element or intervening elements may also be present. In contrast, when an element is referred to as being "directly connected" or "directly coupled" to another element, there are no intervening elements present. Terms used herein are to be given their ordinary meaning unless explicitly defined otherwise herein.

Figure 3:
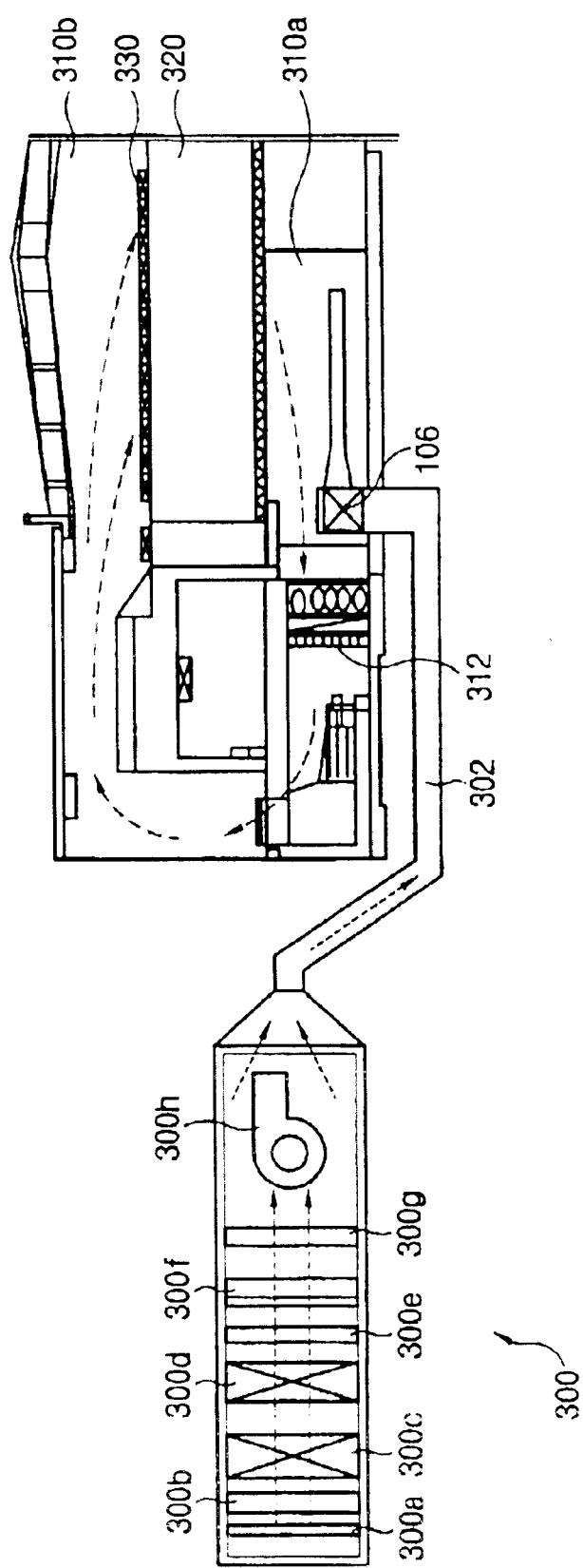
FIG. 3 is a schematic view that illustrates embodiments of clean room systems according to the present invention.

FIG. 3 is a schematic diagram that illustrates embodiments of clean room systems according to the present invention. As shown in FIG. 3, the clean room system includes a clean room 320 in which integrated circuit devices are fabricated. An air conditioning system 300 accepts external air (i.e., air external to the clean room 320) and provides fresh air, via a fresh air duct 302, downstream to a lower space 310A of the clean room 320. The fresh air is then circulated to an upper space 310B of the clean room 320 as illustrated.

The air conditioner 300 filters particles in the external air using a plurality of filters 300A, 300B, 300C and 300D. The air conditioner 300 can also include a heater 300E and a cooler 300F, located downstream from the filters 300A–300D, for controlling the temperature of the air. The air conditioner 300 can further include a humidifier 300G, downstream from the heater 300E and cooler 300F, for adjusting the humidity of the air. The humidifier 300G is located downstream from the filters 300A–300D to avoid introducing excessive moisture into the filters 300A–D which could otherwise adversely affect the efficiency of the filters. The air conditioner 300 can further include a blower 300H, at an outlet of the air conditioner 300, configured to force the fresh air from the air conditioner 300 into the fresh air duct 302.

The air conditioner 300 will now be described in greater detail. The filters 300A–300D can be selected to filter particles of different sizes. Moreover, the filters 300A–300D can be arranged in a sequence according the size of the particles to be filtered. For example, filter 300A can be selected to filter the largest particles whereas each of the remaining filters can be arranged to filter decreasingly smaller particles such that filter 300D filters the smallest sized particles of the filters 300A–300D.

External air is introduced into the air conditioner 300 through a roll filter 300A which can remove impurities from the external air. A demister 300B is located downstream from the roll filter 300A and is configured to remove or reduce the moisture and impurities in the air. A medium filter 300C is located downstream from the demister 300B and is configured to remove minute dust from the air, preferably at an efficiency of at least about 90%. In some embodiments according to the present invention, the medium filter 300C is an HEPA filter which can filter particles having a size of about 0.3 μm from the air at an efficiency of at least about 99.97%.

In some embodiments according to the invention, the heater 300E and the cooler 300F are located downstream from the filters 300A–D. In some embodiments according to the present invention, the cooler 300F is located downstream from the heater 300E so that moisture introduced into the air by the heater 300E can be reduced by the cooler 300F.

In other embodiments according to the present invention, the heater 300E and the cooler 300F are upstream from the filters 300A–300D. The air output from the heater 300E flows through the humidifier 300G before being provided to the clean room 320 so that the humidity of the air can be adapted if needed. A blower 300H is located at the outlet of the air conditioner 300 to force the fresh air from the air conditioner 300 into the fresh air duct 302. During times when the sand dust phenomenon occurs, the density of the particle impurities in the fresh air can be about 1,200,000 EA/cfm (cubic feet per minute).

The fresh air duct 302 is configured to conduct the fresh air from the air conditioner 300 to the lower space 310A of the clean room. The fresh air duct 302 includes a filter 106 which provides secondary filtering of the fresh air provided by the air conditioner 300. The filter 106 can be selected based on the types of particles and contaminants contained in the external air at a particular time. Because the fresh air has passed through filters 300A–300D, the filter 106 preferably has an efficiency that is at equal or superior to the filter efficiency of the filter 300D.

In some embodiments according to the present invention, the filter 106 is an HEPA filter capable of filtering particles having a size of about 0.3 μm at an efficiency of at least 99.97%. In other embodiments according to the present invention, the filter 106 is an ULPA filter that is capable of filtering particles having a size in a range between about 0.12 μm and about 0.17 μm at an efficiency of at least about 99.99%. In other embodiments according to the present invention, when the external air includes contaminants, such as sulfuric acid or nitric oxide, a chemical filter can also be provided in the fresh air duct 302 (as described herein, for example, with reference to FIG. 10). For example, during times when the sand dust phenomenon occurs, the density of 0.3 μm sized particles in the filtered fresh air provided by an HEPA filter 106 can be in a range between about 400,000 EA/cfm and about 500,000 EA/cfm.

According to the present invention, the inclusion of the filter 106 in the fresh air duct 302 downstream from the filters 300A–D in the air conditioner 300 allows the particles in the air to be filtered in separate steps. When the density of the particles in the external air is exceptionally high, such as when the yellow sand dust phenomenon occurs, embodiments according to the present invention can nonetheless provide adequate filtering for clean rooms. Otherwise, the external air may be contaminated with so many particles that the efficiency of the filters 300A–300D is reduced to the point that the air provided by the air conditioner 300 causes an unacceptable number of defects in the manufacturing process in the clean room. Therefore, the filter 106 can further filter the fresh air provided by the air conditioner 300 to provide fresh air having a lower density of particles than the fresh air provided by the air conditioner 300, particularly when the yellow sand dust phenomenon occurs.

In some embodiments according to the present invention, the type of filtering provided in the fresh air duct 302 can be adjusted as the condition of the external air changes. For example, if the external air includes chemical contaminants, such as sulfuric oxide or nitric oxide, the filter 106 can be a chemical filter. In some embodiments according to the present invention, an HEPA filter or an ULPA filter can be used if the particle size is particularly small.

Figure 6:
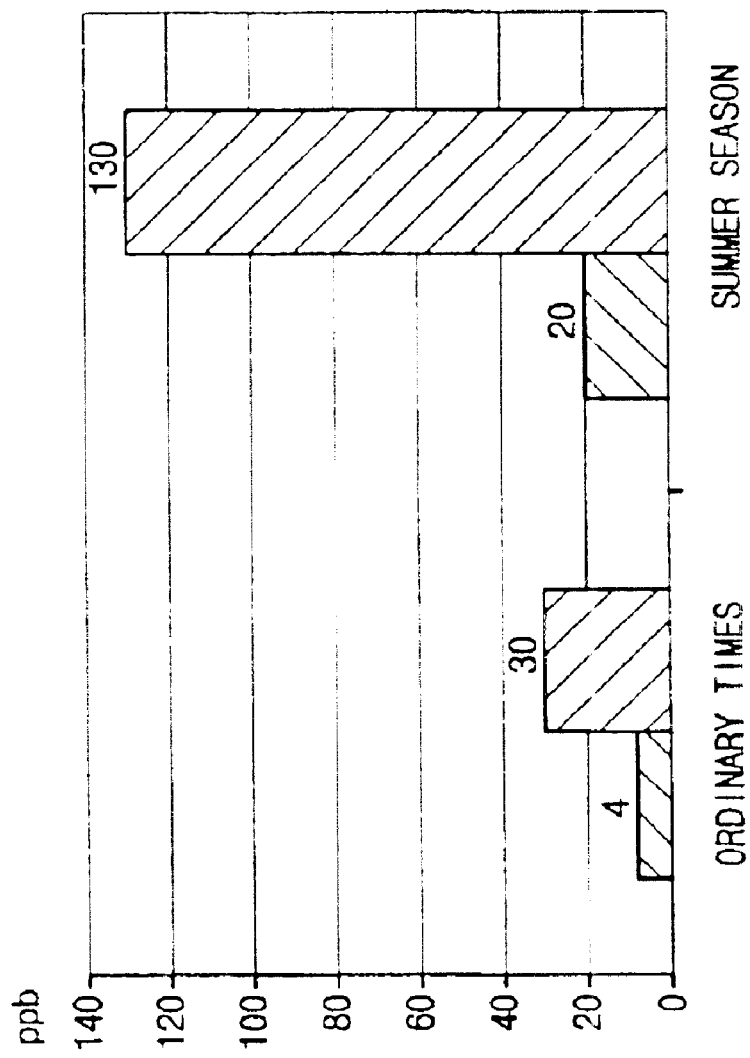
FIG. 6 is a bar graph that illustrates the density of ozone present in a clean room at different times of the year.

Furthermore, in the summer months in Korea, the density of ozone in the air may be higher than in other times of the year. FIG. 6 is a bar graph illustrating differences in the density of ozone in a clean room measured in a summer season and in other times during the year. In particular, the bar graph on the left side of FIG. 6 shows the minimum and maximum values of the density of ozone measured in the clean room during times of the summer months (i.e., ordinary times). In contrast, the bar graphs on the right side of FIG. 6 illustrates the minimum and maximum values of ozone density measured in a clean room during the summer season. As shown in FIG. 6, the density of the ozone measured in the clean room during the summer season is 4 to 4½ times greater than the density of the ozone measured in the clean room during other times of the year. Therefore, according to the present invention, an ozone filter may be attached to the fresh air duct during the summer season to provide additional filtering of ozone. If the increased amount of ozone in the external air is not filtered, the density of the ozone introduced into the clean room may increase and thereby cause additional defects in the integrated circuits fabricated therein.

Figure 4B:
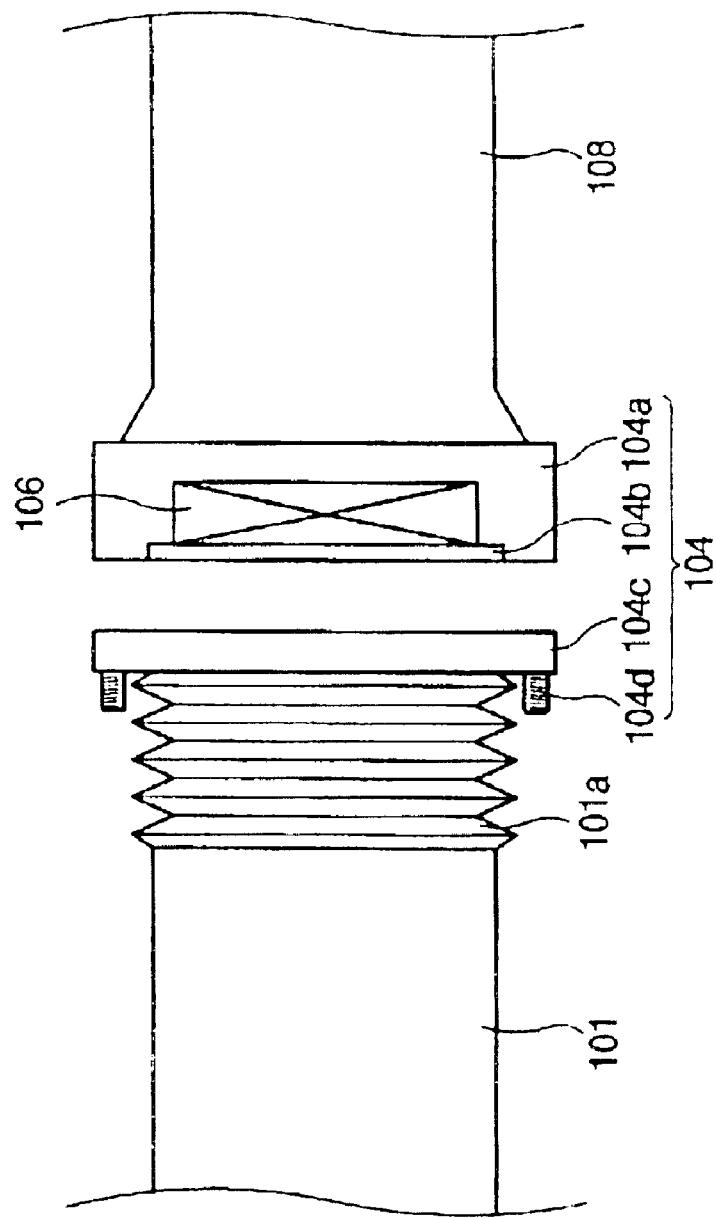

The fresh air duct 302 will now be described in further detail. FIGS. 4A and 4B are sectional views that illustrate embodiments of fresh air ducts according to the present invention. According to FIG. 4A, the fresh air duct 302 is located downstream from the air conditioner system 300. In some embodiments according to the present invention, the fresh air duct 302 is configured to conduct the fresh air provided by the air conditioner 300 from a first portion 101 of the fresh air duct 302 downstream to a second portion 108 of the fresh air duct 302 along a pathway defined by the fresh air duct 302 to the clean room.

The fresh air duct 302 includes a filter 106 positioned in the pathway. In some embodiments according to the present invention, the filter 106 is an HEPA filter capable of filtering particles having a size of 0.3 μm at an efficiency of at least about 99.97%, or an ULPA filter capable of filtering particles having a size of about 0.1 μm at an efficiency of at least about 99.99%. It will be further understood that an ozone filter capable of removing ozone and/or a chemical filter for filtering chemical contaminants such as sulfuric oxide or nitric oxide may be used in addition to the filters discussed above.

In some embodiments according to the present invention, the filter 106 is detachably coupled within the second portion 108 and filters the air provided through the first portion 101 to provide filtered fresh air downstream of the filter 106. The first portion 101 is releasably coupled to the second portion 108 so that the filter 106 may be more easily removed from the fresh air duct 302 compared to conventional systems.

In some embodiments according to the present invention, a flexible section 101A of the first portion 101 allows an output of the first portion 101 to be retracted from an input of the second portion 108 so that the filter 106 can be exposed and thereby accessed for detachment and replacement as shown, for example, in FIG. 4B. It will be further understood that the flexible section 101A may flex from side to side in addition to retracting from the input to the second portion 108 to further facilitate ease of replacement of the filter 106. In some embodiments according to the present invention, the flexible section 101A is in the form of bellows as shown in FIG. 4A. In other embodiments according to the present invention, the flexible section 101A can be an elastic material, such as rubber, and takes the form of a sleeve without the bellows type of arrangement shown in FIG. 4A.

In some embodiments according to the present invention, an attachment section 104 includes first and second pieces that are releasably coupled to one another thereby allowing the first and second portions 101, 108 to be releasably coupled to one another. The first piece is coupled to the output of the first portion 101 whereas the second piece is coupled to the input of the second portion 108. It will be understood that other configurations of the attachment section 104 may be used.

In particular, the first piece of the attachment section 104 includes a fixing frame 104C and a fastening member 104D. The second piece of the attachment section 104 includes a filter frame 104A which positions the filter 106 along the pathway defined by the fresh air duct and a grill 104B which overlies and can protect the filter 106. The first piece of the attachment section 104 is configured to be releaseably coupled to the second piece of attachment section 104 by securing the filter frame 104A to the fixing frame 104C using the fastening member 104D. In some embodiments according to the present invention, the fastening member 104D includes a plurality of bolts or screws located near the edges of the fixing frame 104C. A plurality of holes are located in the filter frame 104A so that the fastening member 104D, such as a plurality of bolts or screws, can be aligned and inserted into the holes. The plurality of bolts or screws can then be tightened to couple the first piece of the attachment section 104 to the second piece of attachment section 104, thereby coupling the first portion 101 to the second portion 108.

It will be understood that in other embodiments according to the present invention, the fastening member 104 can be other mechanisms, such as latches. It will be understood that in some embodiments according to the present invention, a series of attachment sections may be included in the fresh air duct 302 wherein each of the respective attachment sections holds a respective filter for a specific use in further filtering the fresh air.

Figure 5:
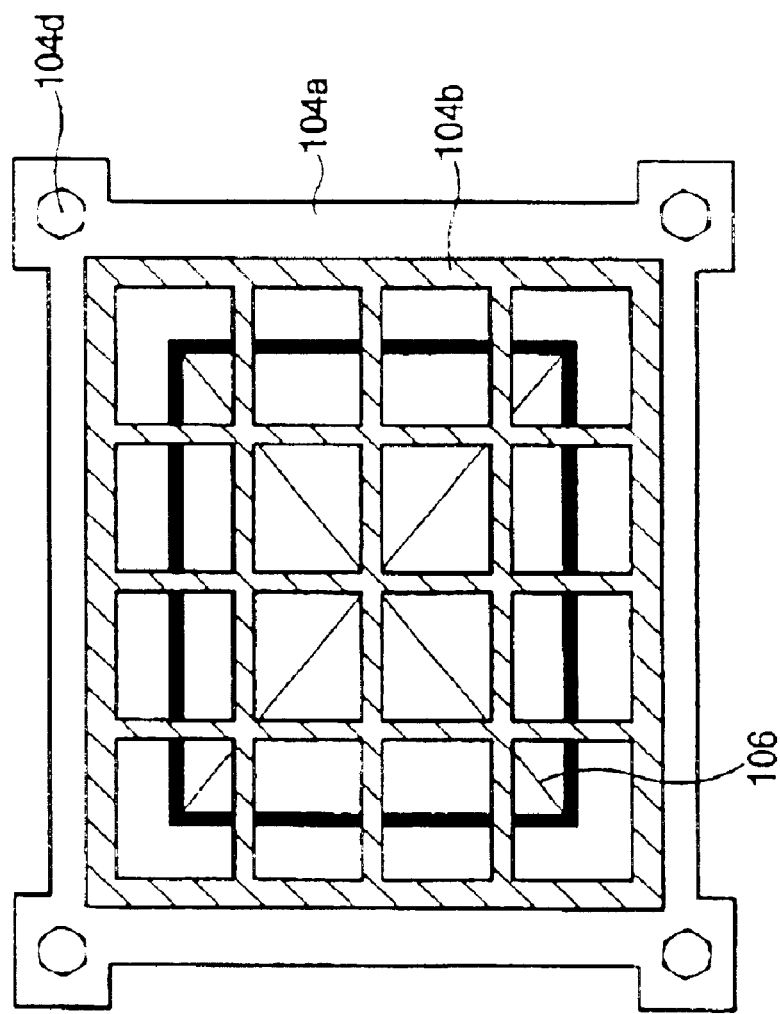
FIG. 5 is a schematic frontal view that illustrates embodiments of a filter on a filter frame and grill according to the present invention.

FIG. 5 is a frontal view that illustrates embodiments of the second piece of the attachment section 104 according to the present invention. As discussed above, the filter frame 104A provides a space in which the filter 106 can be inserted. The grill 104B is detachably installed adjacent to a face of the filter frame 104A, such as the face which faces upstream. The grill 104B can be a lattice-type grill which supports and protects the filter 106.

In operation, the filter 106 can be replaced by stopping or slowing the blower 300H to reduce-the air flow downstream to the filter 106. In some embodiments according to the present invention, the filter 106 is replaced by loosening the fastening member 104D thereby releasing the fixing frame 104C from the filter frame 104A as shown in FIG. 4B. The flexible section 101A can be retracted from the second portion 108 to expose the filter 106. The grill 104B is removed from the filter frame 104A and the filter 106 is removed from the filter frame 104A. A replacement filter 106 is mounted in the filter frame 104A and the grill 104B is replaced over the replacement filter 106 and secured to the filter frame 104A. The flexible section 101A is extended so that the fixing frame 104C contacts the filter frame 104A and the fastening member 104D is used to fasten the first portion 101 to the second portion 108 of the fresh air duct 302.

Returning now to the description of the clean room system shown in FIG. 3, air flowing from the fresh air duct 302 passes through the filter 106 and is introduced through an outlet into a lower space 310A of the clean room. An air circulating section 312 circulates the air from the lower space 310A to an upper space 310B located above the ceiling of the clean room. The air circulating section 312 further circulates the air already existing in the clean room with the fresh air that is supplied via the fresh air duct 302. The air circulating section 312 includes a pre-filter for filtering contaminated air in the lower space 310A. The air circulating section 312 also includes a bag filter capable of filtering particles contained in the air and an efficiency of at least about 90% and an axial fan for circulating the air that is passed through the filters.

A clean room filter 330 filters the air supplied from the air circulating section 312 into the clean room 320. The clean room filter 330 can be located in the ceiling of the clean room 320. The air filtered by the clean room filter 330 travels from the upper space 310B through a grating into the clean room 320. The air exits the clean room 320 into the lower space 310A. The air in the lower space 310A can be recirculated into the upper space 310B above the ceiling of the clean room 320 through the air circulating section 312.

Accordingly, the clean room filter 330 filters the particles contained in the air before the air is introduced into the clean room 320. The clean room filter 330 filters particles that are smaller than the particles filtered by the filters 300A–300D. Because the particles contained in the external air can be removed or greatly reduced by the filter 106, the clean room filter 330 can be used to filter the contaminants in the clean room 320 generated by the manufacturing process itself. In some embodiments according to the present invention, the clean room filter 330 can be an ULPA filter capable of filtering particles having a size and a range between about 0.12 μm and about 0.17 μm at an efficiency of at least about 99.99%.

In some embodiments according to the present invention, about 70% of the air introduced into the clean room 320 is circulated throughout the clean room 320. Furthermore, in some embodiments according to the present invention, about 30% of the air is discharged from the clean room system through an exhaust apparatus that operates during the fabrication of integrated circuits in the clean room 320. Therefore, a volume of air equal to 30% of air discharged by the exhaust system is introduced through the fresh air duct 320 according to the present invention.

Figure 7:
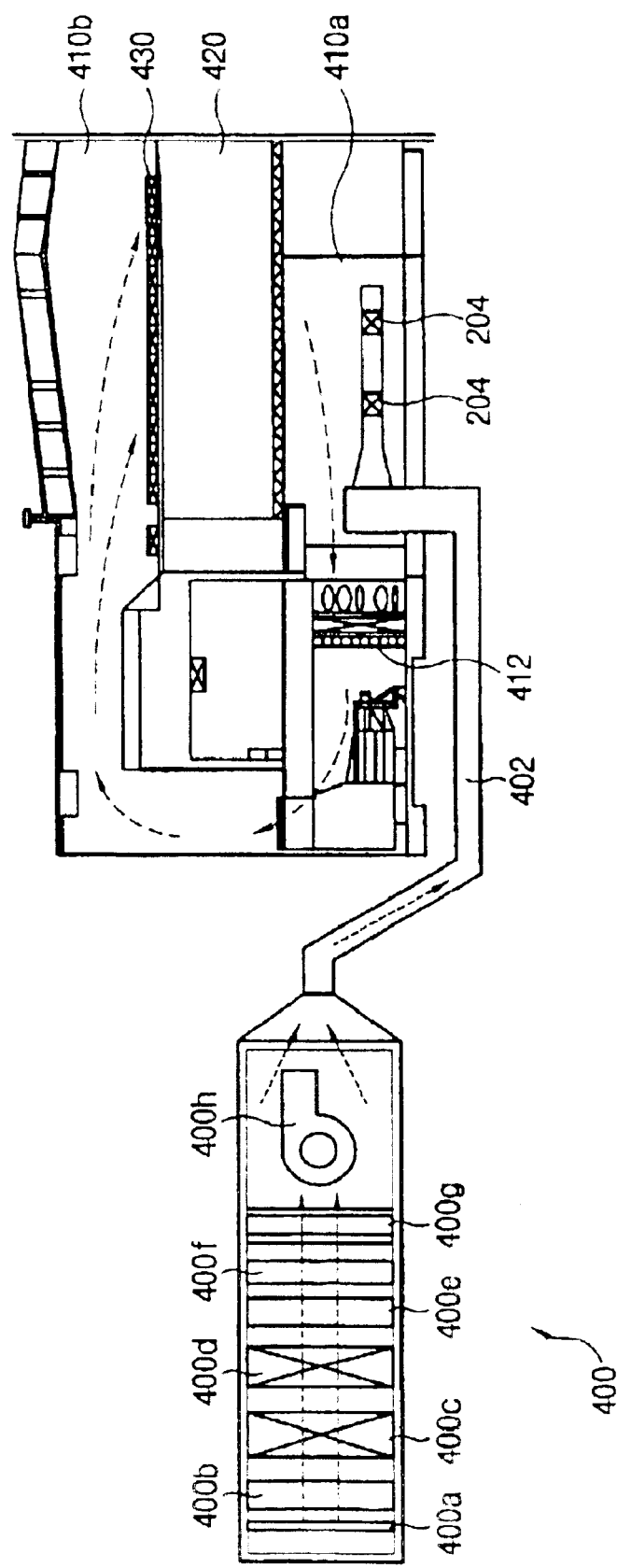
FIG. 7 is a schematic view that illustrates embodiments of clean room systems according to the present invention.

FIG. 7 is a schematic diagram illustrating embodiments of a clean room system according to the present invention. The clean room system shown in FIG. 7 is substantially identical to the clean room system disclosed above in reference to FIG. 3. Accordingly, a detailed description of many of the common elements of the clean room system shown in FIG. 7 will not be repeated here. Generally, reference numbers 400a–400h, 412, 410b and 430 correspond to reference numbers 300a–300h, 312, 310b and 330 respectively, as illustrated in FIG. 3.

In some embodiments according to the present invention, first and second filters 204 are included in an outlet section of a fresh air duct 402 through which the fresh air is provided to a lower space 410A of the clean room system. In some embodiments according to the present invention, the first and second filters 204 are different from one another. For example, in some embodiments according to the present invention, the first filter 204 can be an HEPA filter whereas the second filter 204 can be an ULPA filter, an ozone filter, or a chemical filter.

Figure 8:
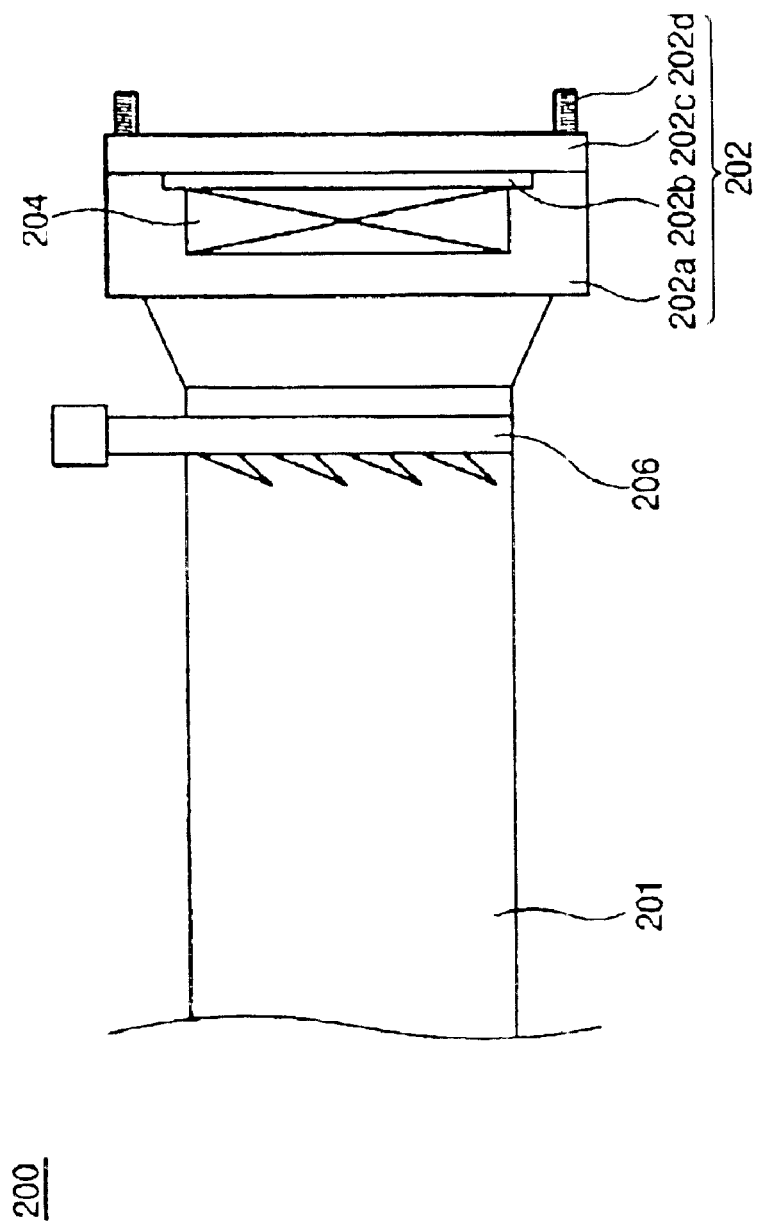
FIG. 8 is a schematic sectional view that illustrates embodiments of fresh air ducts according to the present invention.

FIG. 8 is a sectional view that illustrates embodiments of the outlets 201 of fresh air ducts 200 according to the present invention as shown in FIG. 7. As shown in FIG. 8, the filter 204 is positioned in the outlet portion of the fresh air duct downstream from a damper 206 configured to control the flow of the fresh air through the outlet section 201. In particular, the outlet section 201 is positioned downstream from an air conditioner system 400 and filters the fresh air provided to the clean room 420.

In some embodiments according to the present invention, the filter 204 is positioned along the pathway defined by the outlet section 201 by an attachment section 202 and, in particular, is located in a filter frame 202A. A filter grill 202B overlies the filter 204 and is attached to the filter frame 202A to protect the filter 204 and to hold the filter 204 in place. The attachment section 202 further includes a fixing frame 202C and a fastening member 202D which releasably couples the fixing frame 202C to the filter frame 202A. The fixing frame 202C can be detached from the filter frame 202A by removing the fastening member 202D and the fixing frame 202C to expose the filter 204 which then may be removed and replaced. The fixing frame 202C and fastening member 202D can be recoupled to the filter frame 202A.

In will be understood that the first and second outlets 201 can provide filtered fresh air to different areas of the clean room 420. For example, in some clean rooms, dedicated fresh air duct outlets are provided for different areas which perform photolithography, etching, implant, deposition, as each of these processes may require different degrees of filtering. Therefore, respective outlets 201 according to the present invention can be configured with different filters selected for the different areas of the clean room 420.

Figure 9:
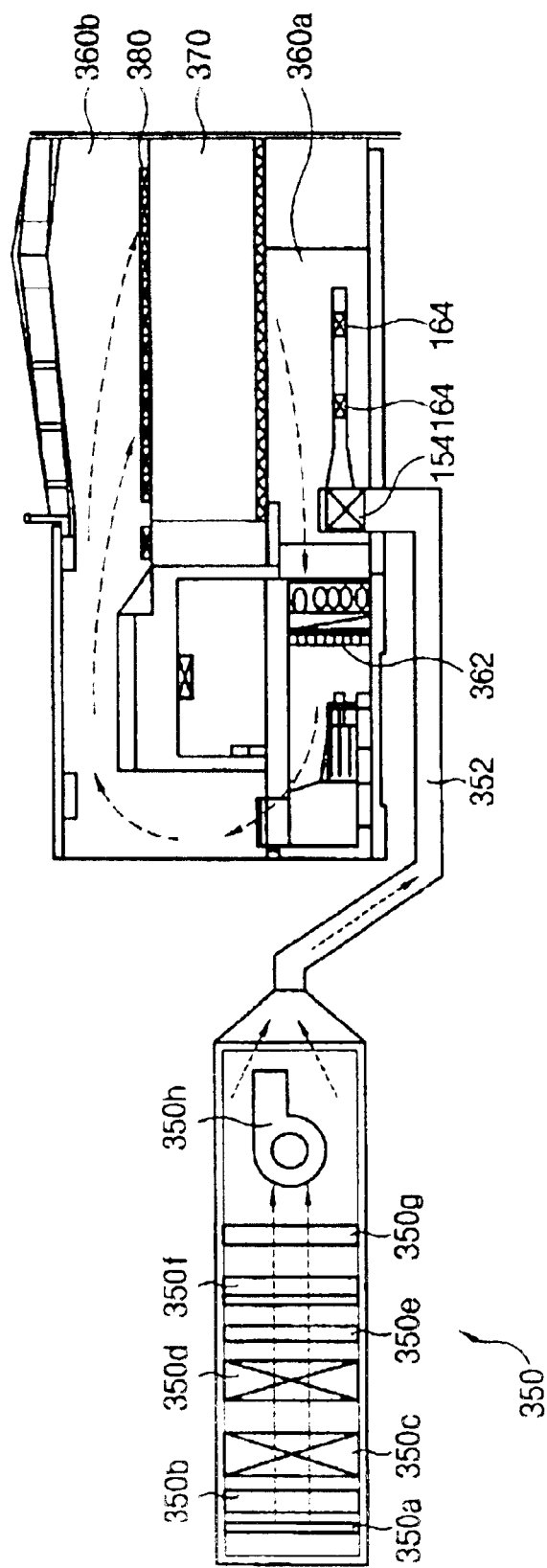
FIG. 9 is a schematic view that illustrates embodiments of clean room systems according to the present invention.

FIG. 9 is a schematic diagram illustrating a clean room system according to the present invention including filters in the fresh air duct and the outlets. In particular, FIG. 9 illustrates a fresh air duct 352 including a filter 154 according to the present invention and first and second auxiliary filters 164 according to the present invention in the outlet sections, as discussed above, for example, in reference to FIGS. 3 and 7 respectively. Accordingly, a further detailed description of these filters is omitted. Generally, reference numbers 350a–350h, 360A–360B, 362, 370 and 380 correspond to reference numbers 300A–300H, 310A–310B, 312, 320 and 330 respectively in FIG. 3.

Generally, the fresh air duct 352 includes at least one filter 154 for filtering particles contained in the air provided by an air conditioning system 350 located upstream. The auxiliary filters 164 are located at first and second outlets and can be different types of filters. For example, one of the auxiliary filters 164 can be an HEPA filter whereas the other auxiliary filter 164 can be an ULPA filter, an ozone filter, or a chemical filter.

Figure 10:
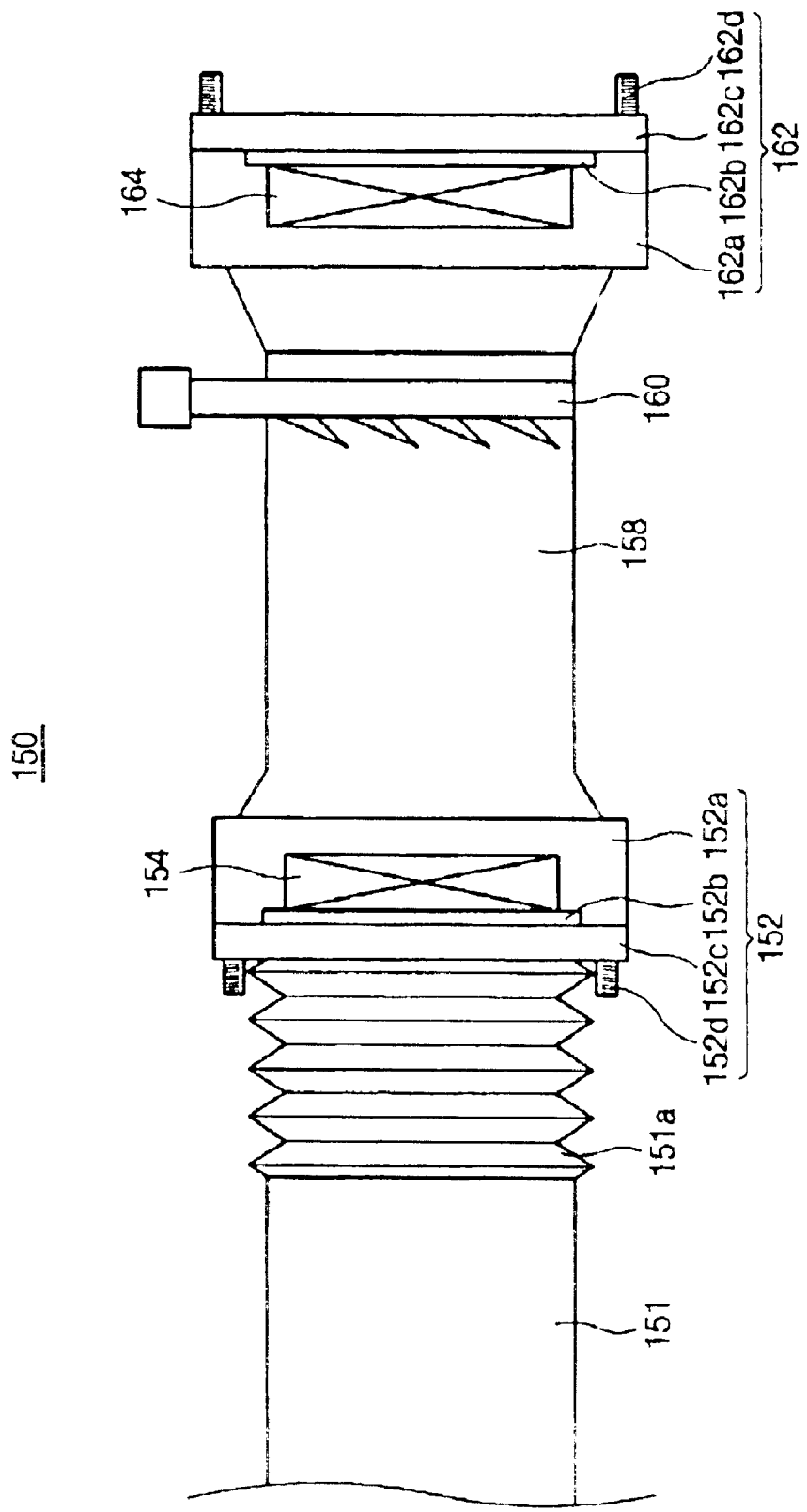
FIG. 10 is a schematic sectional view that illustrates embodiments of fresh air ducts according to the present invention.

FIG. 10 is a sectional view that illustrates embodiments of fresh air ducts according to the present invention. According to FIG. 10, a fresh air duct 150 including a filter 154 is substantially identical to the fresh air ducts illustrated in FIGS. 4A and 4B and further includes an auxiliary filter 164 located downstream from the filter 154. According to FIG. 10, fresh air provided by an upstream air conditioner flows into a first portion 151 of the fresh air duct 150 which travels downstream to a second portion 158 of the fresh air duct 150 through the filter 154. The elements shown in FIG. 10, including a first attachment section 152, a fixing frame 152C, a fastening member 152D, a filter frame 152A, a grill 152B and a flexible section 101A, are substantially the same as those described above in reference to FIGS. 4A and 4B and will not be described further.

The fresh air duct 150 further includes a damper 160 downstream from the second portion 158. The damper 160 is configured to interrupt or reduce the flow of fresh air downstream. The auxiliary filter 164 is located downstream from the damper 160 and is positioned along the pathway defined by the second portion 158. In particular, the auxiliary filter 164 is positioned in the second portion 158 adjacent to the output therefrom. The filter 164 is connected to a second attachment section 162. The second attachment section 162 includes an auxiliary filter frame 162A which holds the auxiliary filter 164 and a grill 162B which overlies the auxiliary filter 164. The auxiliary filter frame 162A is releasably coupled to a fixing frame 162C by a fastening member 162D. In some embodiments according to the present invention, the auxiliary filter 164 can be an HEPA filter, an ULPA filter, a chemical filter, or an ozone filter. In some embodiments according to the present invention, the auxiliary filter 164 is an ozone filter or a chemical filter. During times when the sand dust phenomenon occurs, the density of 0.3 μm sized particles in the filtered fresh air provided by the auxiliary filter 164 can be in a range between about 1,000 EA/cfm and about 2,000 EA/cfm.

Figure 11:
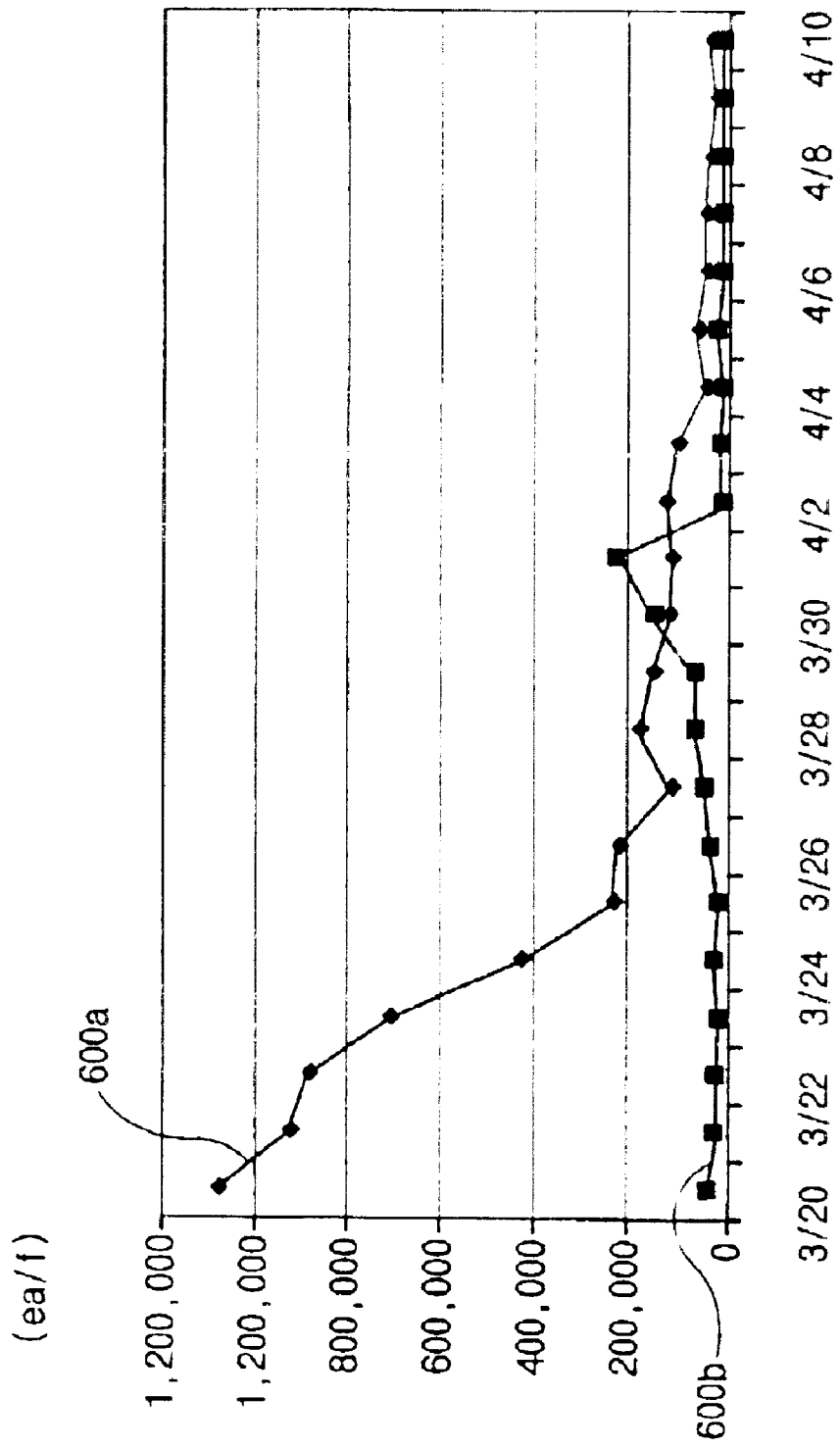
FIG. 11 is a graph that illustrates comparative measurements of particles in a conventional clean room system and in embodiments of a clean room system according to the present invention.

FIG. 11 is a graph illustrating the amount of particles measured in a fresh air duct of a conventional clean room system compared to the amount of particles measured in a fresh air duct according to embodiments of the present invention. The measurements were taken during the period from Mar. 20, 2001 to Apr. 10, 2001 in The Republic of Korea. The yellow sand dust phenomenon discussed above occurred during the period from Mar. 20, 2001 to Mar. 25, 2001 and from Apr. 7, 2001 to Apr. 10, 2001 (hereinafter referred to as the "interval"). During this time, the maximum dust density at the peak time was in a range between above 500 $\mu g/m^3$ and about 1000 $\mu g/m^3$.

As shown by 600a in FIG. 11, the amount of particles in the fresh air duct of the conventional system was abnormally high during the interval. In contrast, as shown by 600b in FIG. 11, the amount of particles in a fresh air duct according to embodiments of the present invention, was not abnormally high and was less than that measured in the conventional fresh air duct during the interval. In FIG. 11, the increase in the amount of particles for the period from Mar. 30, 2001 to Apr. 2, 2001 was caused by a measurement error. As illustrated by FIG. 11, the fresh air provided to the clean room by embodiments according to the present invention, may be contaminated by fewer particles compared to conventional approaches, even during the yellow sand dust phenomenon.

Figure 12:
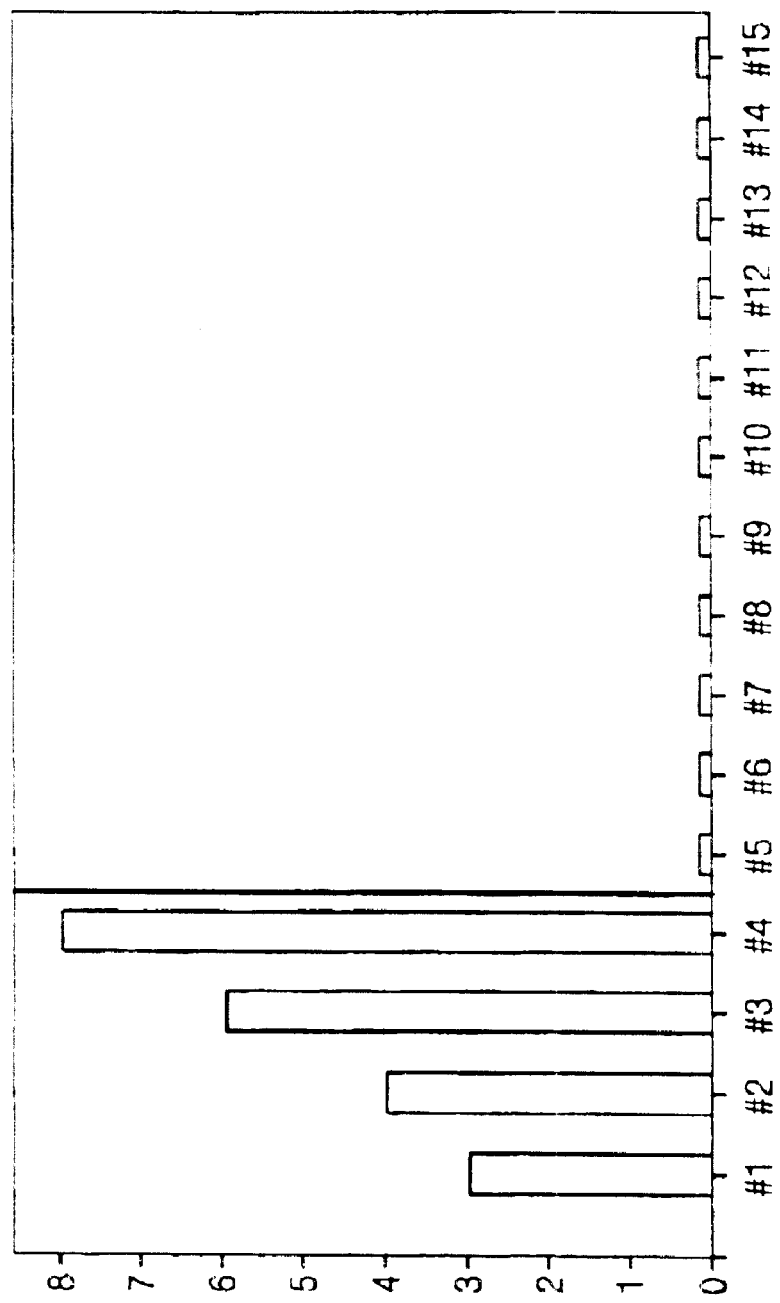
FIG. 12 is a bar graph that illustrates comparative measurements of the density of silicon in baths in a conventional clean room and in embodiments of clean rooms according to the present invention.

FIG. 12 is a bar graph illustrating densities of silicon measured in a cleaning liquid bath in a conventional clean room and densities of silicon measured in a cleaning liquid bath in a clean room according to embodiments of the present invention. According to FIG. 12, the density of silicon detected in the cleaning liquid number 1 to number 4 in the bath in the conventional clean room was in a range between about 3 and about 8 parts per billion. In contrast, the density of silicon measured in the cleaning liquid bath of the clean room according to embodiments of the present invention (number 6 to number 15) was less than 1 part per billion. Accordingly, the contamination of the clean room due to particles in the external air was reduced in clean rooms utilizing embodiments according to the present invention.

It should be noted that many variations and modifications might be made to the embodiments described above without substantially departing from the principles of the present invention. All such variations and modifications are intended to be included herein within the scope of the present invention, as set forth in the following claims.

What is claimed:

1. An apparatus for providing fresh air to a clean room, comprising:
   a fresh air duct having a first portion configured to direct fresh air from an input of the fresh air duct to an output of the first portion; and a second portion releaseably coupled to the output of the first portion and configured to direct fresh air from the output of the first portion along a pathway through the second portion, the fresh air duct including an outlet portion downstream from the second portion, the fresh air duct configured to direct fresh air filtered by an air conditioning system towards a clean room downstream from the fresh air duct, the fresh air having a first level of particle density;
   a first detachable filter comprising a separate particle filter in the second portion of the fresh air duct, downstream from the air conditioning system and upstream from the clean room, configured to further filter the fresh air to provide filtered fresh air having a second level of particle density therein that is less than the first level; and
   a second detachable filter in the outlet portion of the fresh air duct configured to provide filtered air downstream of the second detachable filter to the clean room.

2. An apparatus according to claim 1 wherein the first detachable filter is located adjacent to an input of the second portion of the fresh air duct.

3. An apparatus according to claim 1 wherein the first portion further comprises:
   a flexible section configured to allow the first portion of the fresh air duct to move away from an input of the second portion of the fresh air duct to expose the first detachable filter.

4. An apparatus according to claim 1, wherein the first particle filter comprises at least one of an HEPA filter configured to filter at least about 99.97% of particles about 0.3 $\mu$m in size from the fresh air generated by the air conditioning system, an ULPA filter configured to filter at least about 99.99% of the particles about 0.1 $\mu$m to about 0.17 $\mu$m in size from the fresh air generated by the air conditioning system, and an ozone filter.

5. An apparatus according to claim 4, wherein the second filter comprises at least one of an HEPA filter configured to filter about 99.97% of particles about 0.3 $\mu$m in size from the fresh air generated by the air conditioning system, an ULPA filter configured to filter about 99.99% of particles about 0.1 $\mu$m in size from the fresh air generated by the air conditioning system, a chemical filter and an ozone filter.

6. An apparatus for providing fresh air to a clean room, comprising:
   a fresh air duct having a first portion configured to direct fresh air from an input of the fresh air duct to an output of the first portion; and a second portion releaseably coupled to the output of the first portion and configured to direct fresh air from the output of the first portion along a pathway through the second portion, the fresh air duct configured to direct fresh air filtered by an air conditioning system towards a clean room downstream from the fresh air duct, the fresh air having a first level of particle density;
   a first detachable filter comprising a separate particle filter in the second portion of the fresh air duct, downstream from the air conditioning system and upstream from the clean room, configured to further filter the fresh air to provide filtered fresh air having a second level of particle density therein that is less than the first level;
   a third portion of the fresh air duct coupled to the second portion, the third portion having at least one output therefrom; and
   a second detachable filter located in the third portion configured to filter the fresh air conducted along the pathway to the at least one output from the fresh air duct into the clean room.

7. An apparatus for providing fresh air to a clean room, comprising:
   a fresh air duct having a first portion configured to direct fresh air from an input of the fresh air duct to an output of the first portion; and a second portion releaseably coupled to the output of the first portion and configured to direct fresh air from the output of the first portion along a pathway through the second portion, the fresh air duct configured to direct fresh air filtered by an air conditioning system towards a clean room downstream from the fresh air duct, the fresh air having a first level of particle density;
   a first detachable filter comprising a separate particle filter in the second portion of the fresh air duct, downstream from the air conditioning system and upstream from the clean room, configured to further filter the fresh air to provide filtered fresh air having a second level of particle density therein that is less than the first level;
   a third portion of the fresh air duct coupled to the second portion, the third portion having a plurality of outputs therefrom; and
   a plurality of detachable filters in the third portion upstream from the plurality of outputs.

8. An apparatus for providing fresh air to a clean room, comprising:
a fresh air duct downstream from an air conditioning system configured to direct fresh air filtered by the air conditioning system to a clean room, the fresh air duct having a first portion configured to direct air from an input of the fresh air duct to an output of the first portion and a second portion releaseably coupled to the output of the first portion and configured to direct air from the output of the first portion along a pathway through the second portion;
a first detachable filter, in the second portion of the fresh air duct, configured to filter the fresh air to provide filtered fresh air downstream of the detachable filter;
an outlet portion of the fresh air duct downstream from the second portion; and
a second detachable filter in the outlet portion configured to provide filtered air downstream of the second detachable filter into the clean room.

9. An apparatus according to claim 8 wherein the first detachable filter is located in the second portion adjacent to an input thereto.

10. An apparatus according to claim 8 wherein the first portion further comprises:
a flexible section configured to allow the first portion of the fresh air duct to move away from the input of the second portion of the fresh air duct to expose the first detachable filter.

11. An apparatus according to claim 8 wherein the first detachable filter comprises an HEPA filter, an ULPA filter, a chemical filter, or an ozone filter.

12. An apparatus for providing fresh air to a clean room, comprising:
a fresh air duct downstream from an air conditioning system configured to direct fresh air filtered by the air conditioning system to a clean room, the fresh air duct having a first portion configured to direct air from an input of the fresh air duct to an output of the first portion and a second portion releaseably coupled to the output of the first portion and configured to direct air from the output of the first portion along a pathway through the second portion;
a first detachable filter, in the second portion of the fresh air duct, configured to filter the fresh air to provide filtered fresh air downstream of the detachable filter;
a third portion of the fresh air duct coupled to the second portion, the third portion having at least one outlet therefrom; and
a second detachable filter included in the third portion configured to filter the air conducted along the pathway to the at least one outlet into the clean room.

13. An apparatus according to claim 12, wherein the second detachable filter comprises at least one of an HEPA filter, an ULPA filter, a chemical filter, and an ozone filter.

14. An apparatus for providing fresh air to a clean room, comprising:
a fresh air duct downstream from an air conditioning system configured to direct fresh air filtered by the air conditioning system to a clean room, the fresh air duct having a first portion configured to direct air from an input of the fresh air duct to an output of the first portion and a second portion releaseably coupled to the output of the first portion and configured to direct air from the output of the first portion along a pathway through the second portion;
a first detachable filter, in the second portion of the fresh air duct, configured to filter the fresh air to provide filtered fresh air downstream of the detachable filter;
a third portion of the fresh air duct coupled to the second portion, the third portion having a plurality of outlets therefrom; and
a plurality of detachable filters in the third portion adjacent to the plurality of outlets.

15. An apparatus according to claim 14, wherein the third portion further comprises a damper upstream from at least one of the plurality of outlets, the damper being configured to control a flow of air downstream from the damper along the pathway.

16. A clean room fresh air supply system comprising:
an air conditioning system configured to accept external air and provide fresh air therefrom filtered by the air conditioning system downstream to a clean room, the fresh air having a first level of particle density;
a fresh air duct downstream from the air conditioning system and configured to conduct the fresh air along a pathway therein;
a first detachable filter downstream from the air conditioning system in the fresh air duct and upstream from the clean room, configured to filter the fresh air to provide fresh air having a second level of particle density that is less than the first level; and
a second detachable filter in the fresh air duct downstream from the first filter configured to further filter the fresh air having the second level of particle density to provide filtered air downstream of the second detachable filter to the clean room.

17. An apparatus according to claim 16, wherein the fresh air duct comprises:
a first portion of the fresh air duct configured to direct air from an input of the fresh air duct to an output of the first portion;
a second portion of the fresh air duct releaseably coupled to the output of the first portion and configured to direct air from the output of the first portion along a pathway through the second portion, wherein the first detachable filter is in the second portion of the fresh air duct.

18. An apparatus according to claim 17 wherein the first detachable filter is located adjacent to an input of the second portion of the fresh air duct.

19. An apparatus according to claim 17 wherein the first portion further comprises:
a flexible section configured to allow the first portion of the fresh air duct to move away from the input of the second portion of the fresh air duct to expose the first detachable filter.

20. An apparatus according to claim 16, wherein the first filter comprises at least one of an HEPA filter configured to filter at least about 99.97% of particles about 0.3 $\mu$m in size from the fresh air generated by the air conditioning system, an ULPA filter configured to filter at least about 99.99% of particles about 0.1 $\mu$m to about 0.17 $\mu$m in size from the fresh air generated by the air conditioning system, and an ozone filter.

21. An apparatus according to claim 20, wherein the second filter comprises at least one of an HEPA filter configured to filter about 99.97% of particles about 0.3 $\mu$m in size from the fresh air generated by the air conditioning system, an UPLA filter configured to filter about 99.99% of particles about 0.1 $\mu$m to about 0.17 $\mu$m in size from the fresh air generated by the air conditioning system, a chemical filter and an ozone filter.

* * * * *